(12) United States Patent
Fluckiger

(10) Patent No.: US 8,089,617 B2
(45) Date of Patent: Jan. 3, 2012

(54) ENERGY EFFICIENT LASER DETECTION AND RANGING SYSTEM

(75) Inventor: David U. Fluckiger, Allen, TX (US)

(73) Assignee: Raytheon Company, Waltham, MA (US)

( * ) Notice: Subject to any disclaimer, the term of this patent is extended or adjusted under 35 U.S.C. 154(b) by 291 days.

(21) Appl. No.: 12/357,122

(22) Filed: Jan. 21, 2009

(65) Prior Publication Data
US 2010/0182587 A1    Jul. 22, 2010

(51) Int. Cl.
*G01C 3/08* (2006.01)
(52) U.S. Cl. ........ 356/4.01; 356/3.01; 356/3.1; 356/4.1; 356/5.01
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | |
|---|---|---|---|
| 5,363,186 A * | 11/1994 | Cohn et al. | 356/4.01 |
| 5,552,893 A | 9/1996 | Akasu | |
| 6,304,321 B1 * | 10/2001 | Wangler et al. | 356/4.01 |
| 6,646,725 B1 | 11/2003 | Eichinger | |
| 6,724,470 B2 | 4/2004 | Barenz et al. | |
| 6,741,341 B2 | 5/2004 | DeFlumere | |
| 6,882,409 B1 | 4/2005 | Evans et al. | |
| 6,914,554 B1 | 7/2005 | Riley et al. | |
| 7,070,107 B2 | 7/2006 | Tsikos et al. | |
| 7,152,795 B2 | 12/2006 | Tsikos et al. | |
| 7,248,343 B2 | 7/2007 | Cardero et al. | |
| 7,327,913 B2 | 2/2008 | Shpantzer et al. | |
| 7,406,220 B1 | 7/2008 | Christensen et al. | |
| 7,453,552 B1 | 11/2008 | Miesak | |
| 7,469,082 B1 | 12/2008 | Okorogu | |
| 7,485,862 B2 | 2/2009 | Danziger | |
| 7,495,748 B1 | 2/2009 | Sandusky et al. | |
| 7,501,644 B2 | 3/2009 | Zani et al. | |
| 7,527,202 B2 | 5/2009 | Tsikos et al. | |
| 7,532,311 B2 | 5/2009 | Henderson et al. | |
| 7,533,821 B2 | 5/2009 | Tsikos et al. | |
| 2005/0285738 A1 | 12/2005 | Seas | |
| 2006/0227317 A1 | 10/2006 | Henderson et al. | |
| 2007/0177841 A1 | 8/2007 | Danziger | |
| 2007/0211995 A1 | 9/2007 | Christensen et al. | |
| 2009/0086298 A1 | 4/2009 | Okorogu | |

OTHER PUBLICATIONS

PCT Notification of Transmittal of the International Search Report and the Written Opinion of the International Searching Authority, or the Declaration; International application No. PCT/US2009/069210; 13 pages; Nov. 18, 2010.

* cited by examiner

*Primary Examiner* — Thomas Tarcza
*Assistant Examiner* — Luke Ratcliffe
(74) *Attorney, Agent, or Firm* — Baker Botts L.L.P.

(57) ABSTRACT

According to one embodiment, a laser detection and ranging system includes a beam forming element that is optically coupled to a light source. The light source generates a light beam that is split by the beam forming element into multiple beamlets and directed toward a target. At least one of the beamlets are reflected from the target as backscattered light that is received by a detector that generates a signal indicative of a characteristic of the target.

21 Claims, 3 Drawing Sheets

US 8,089,617 B2

ENERGY EFFICIENT LASER DETECTION AND RANGING SYSTEM

TECHNICAL FIELD OF THE DISCLOSURE

This disclosure generally relates to laser detection and ranging systems, and more particularly, to a energy efficient laser detection and ranging system that uses multiple beamlets to measure one or more characteristics of a target.

BACKGROUND OF THE DISCLOSURE

Laser detection and ranging devices (LADARs) determine various characteristics of objects by transmitting light energy and receiving the transmitted light energy reflected from the object. As opposed to radio detection and ranging systems (RADARs) that use radio-frequency energy as an operating medium, laser detection and ranging systems use light energy that may possess certain advantages. One such advantage is its ability to be reflected from non-conductive objects that may be generally transparent to radio-frequency energy. Lasers used to generate the light beam produce a coherent beam of monochromatic light that may be ideally suited for detection and measurement of targets over relatively long distances.

SUMMARY OF THE DISCLOSURE

According to one embodiment, a laser detection and ranging system includes a beam forming element that is optically coupled to a light source. The light source generates a light beam that is split by the beam forming element into multiple beamlets and directed toward a target. At least one of the beamlets are reflected from the target as backscattered light that is received by a detector that generates a signal indicative of a characteristic of the target.

Some embodiments of the disclosure may provide numerous technical advantages. For example, one embodiment of the laser detection and ranging system may provide ranging of targets over relatively longer distances than known laser detection and ranging system implementations. The laser detection and ranging system of the present disclosure uses a beam forming element that concentrates the light beam in relatively small portions of the laser detection and ranging system's field-of-view. Using a relatively higher concentration of light intensity on the target provides a corresponding increased intensity of backscattered light for enhanced measurement of the target over relatively longer distances.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Laser detection and ranging devices (LADARs) measure various characteristics of targets using reflected light that is commonly referred to as backscattered light. Characteristics of targets measured by laser detection and ranging devices may include range, speed, size, and various physical vibration modes that targets may exhibit during movement. Although laser detection and ranging systems may provide useful information about targets, their useful range may be limited by the output power level of their associated laser light sources and the desired field-of-view (FOV). A laser detection and ranging system's field-of-view generally refers to the angular window through which characteristics of targets may be measured.

Laser detection and ranging systems having a relatively wide field-of-view may be beneficial for tactical purposes such as when used with aircraft to monitor movement of targets over the ground. A wider field-of-view provides enhanced coverage of a particular region. This wider field-of-view, however, requires a proportionately higher output power level from the laser light source. Because the output power levels of laser light sources used for tactical purposes may be limited, their effective range may therefore be limited using known laser detection and ranging system designs.

Figure 1:
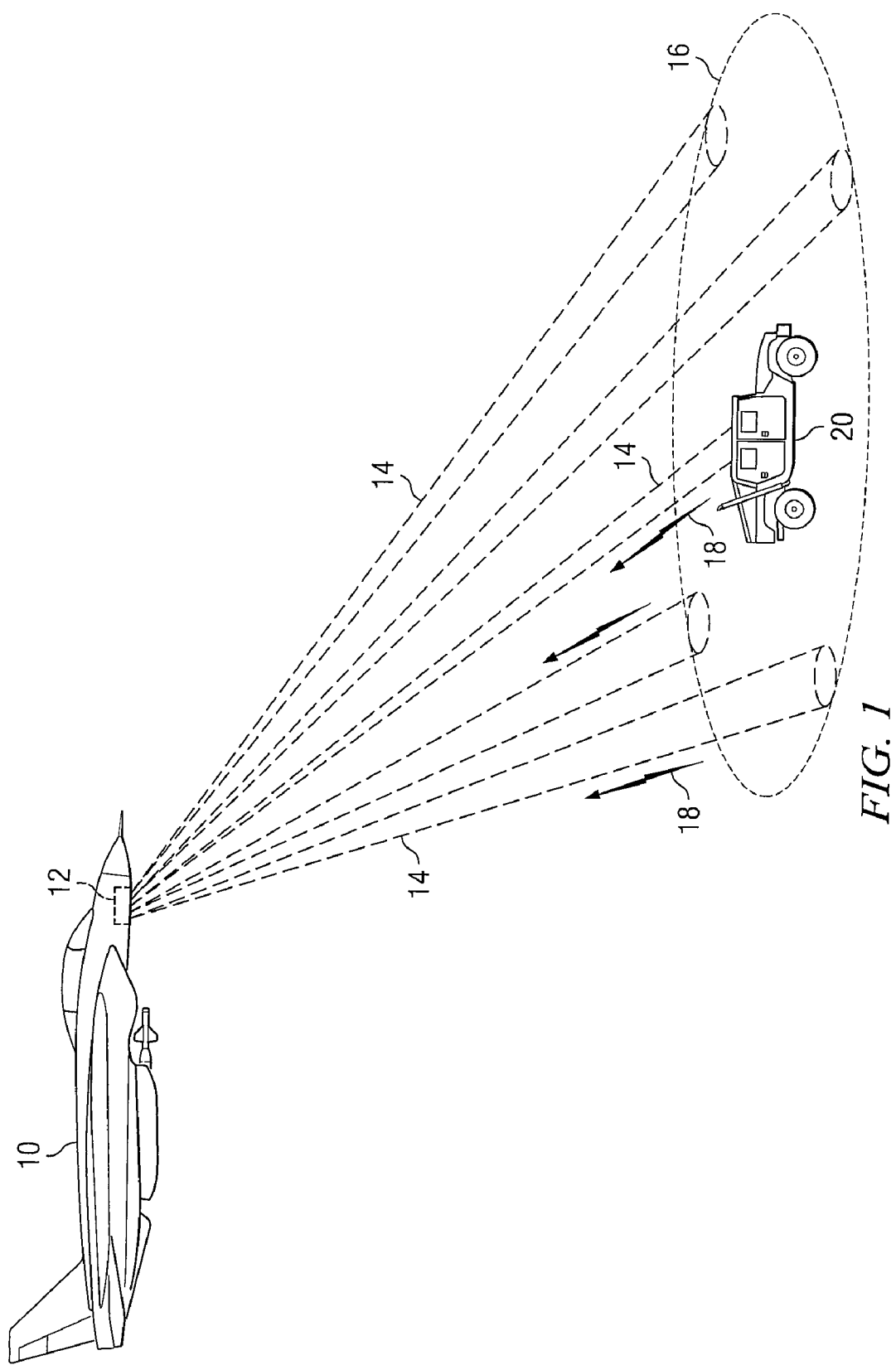
FIG. 1 is an illustration showing an aircraft that is configured with one embodiment of an energy efficient laser detection and ranging system according to the teachings of the present disclosure.

FIG. 1 is an illustration showing an aircraft 10 that is configured with one embodiment of an energy efficient laser detection and ranging system 10 according to the teachings of the present disclosure. Laser detection and ranging system 12 transmits multiple beamlets 14 within a field-of-view 16 of the laser detection and ranging system 12 and receives backscattered light 18 from at least one of the beamlets 14 that is reflected from a target 20. Using the backscattered light 18, laser detection and ranging system 12 measures one or more characteristics of target 20, such as its range, speed, size, or vibration during movement. The beamlets 14 are non-contiguous or angularly spaced apart from one another such that small portions of the laser detection and ranging system's field-of-view 16 are illuminated at any one point in time.

Certain embodiments of laser detection and ranging system 12 may provide enhanced efficiency over known laser detection and ranging system designs due to its illumination pattern having multiple beamlets 14 that are essentially equally spaced apart from one another throughout its field-of-view 16. In this manner, sufficient luminous intensity may be applied to target 20 for its measurement without illuminating the entire region covered by the laser detection and ranging system's field-of-view 16. Because only a portion of the field-of-view 16 is illuminated, laser detection and ranging system 12 may operate with greater efficiency than known laser detection and ranging system designs.

Enhanced efficiency provided by laser detection and ranging system 12 may provide increased range when used with laser light sources having output power limitations. For example, laser detection and ranging system devices configured on tactical aircraft typically have laser light sources that are typically limited to approximately 100 milli-joules (mJ) of output power. Illuminating a region having a field-of-view 16 suitable for tactical purposes may limit the range of known laser detection and ranging system devices to approximately two kilometers. A 100 milli-joule laser light source, however, that generates non-contiguous beamlets 14 may increase the effective useable range of laser detection and ranging system 12 to greater than ten kilometers in some embodiments.

In the particular embodiment shown, laser detection and ranging system 12 is implemented on an aircraft 10 that is configured to measure characteristics of targets 20 moving over the ground. Other embodiments of laser detection and ranging system 12, however, may be implemented on any suitable platform such as on a land-based vehicle, a water-based vehicle, or on a fixed platform such as a ground based station. In other embodiments, laser detection and ranging system 12 may be configured to measure any suitable type of target, which may be, for example, air-based vehicles, water-based vehicles, or fixed structures such terrain features of the Earth.

Figure 2:
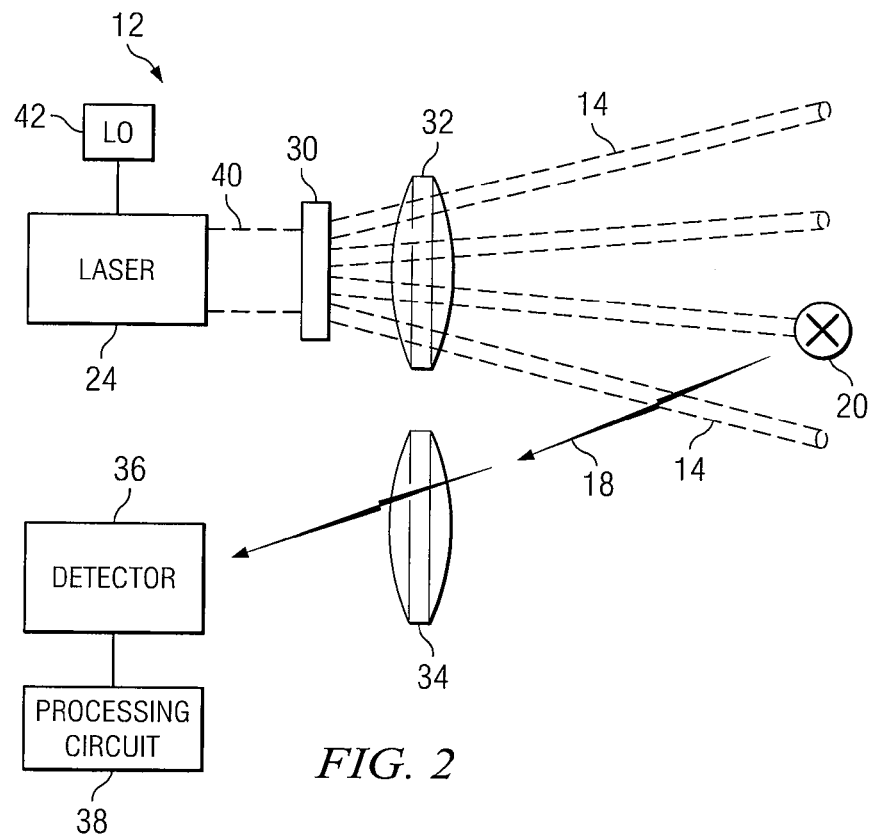
FIG. 2 is a block diagram showing one embodiment of the laser detection and ranging system of FIG. 1.

FIG. 2 is a block diagram showing one embodiment of the laser detection and ranging system 12 of FIG. 1. Laser detection and ranging system 12 includes a laser light source 24, a beam forming element 30, a transmitting lens 32, a receiving lens 34, a detector 36, and a processing circuit 38 that are coupled as shown. Laser light source 24 transmits a light beam 40 that is modified by beam forming element 30 to form beamlets 14. In this particular embodiment, laser light source 24 is a pulsed light source that generates pulses of light in a periodic fashion to form light beam 40. In other embodiments, any suitable type of laser light source 24 may be implemented such as a continuous light source that provides continuous illumination of field-of-view 16 during operation.

In the particular embodiment shown, laser detection and ranging system 10 operates in a direct detection mode in which range information over field-of-view 16 is provided according to a time delay between transmission of beamlets 14 and reception of their backscattered light 18. In other embodiments, laser detection and ranging system 10 may use various modulation techniques such as a heterodyning action to determine other characteristics of object 20, such as its speed or various vibration modes.

Detector 36 may be any suitable type that generates a signal indicative of measurement information received from backscattered light 18. Generated signals are transmitted to processing circuit 38 for determining various characteristics of target 20 and other elements within the laser detection and ranging system's field-of-view 16. In one embodiment, detector 36 includes a two-dimensional array of detector elements that can each generate signals representative of backscattered light levels incident upon its surface. Detector 36 having an array of detector elements may simultaneously receive backscattered light 18 from some, most, or all beamlets 14 transmitted toward target 20.

Certain embodiments incorporating a detector 36 having a two-dimensional array of detector elements may provide ranging information over most or all of the laser detection and ranging system's field-of-view 16 from which additional information may be derived. For example, ranging information over most or all of the laser detection and ranging system's field-of-view 16 may be used to derive terrain information, such as the slope of the ground or other contour features present within the laser detection and ranging system's field-of-view 16.

Beam forming element 30 may be any type of device that splits light beam 40 into multiple beamlets 14. Beam forming element 30 cooperates with transmitting lens 32 to direct beamlets 14 in spaced apart directions such that a two-dimensional, non-contiguous pattern is formed within the laser detection and ranging system's field-of-view 16. In the particular embodiment shown, a two-dimensional array is formed within the field-of-view 16. In other embodiments, other configurations, such as a one-dimensional array may be formed such that the resulting field-of-view has a relatively linear shape.

Figure 3:
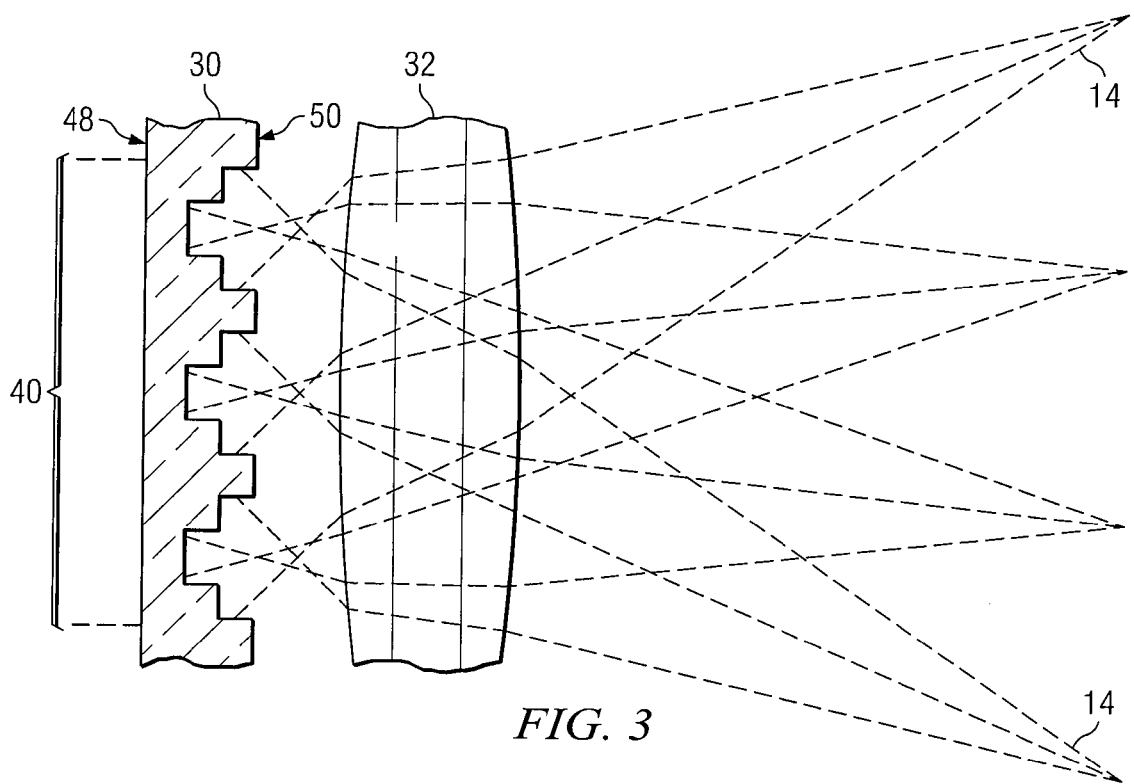
FIG. 3 is an enlarged, cross-sectional view of one embodiment of a beam forming element and a transmitting lens that may be used to generate the non-contiguous beamlets 14 of FIG. 2.

FIG. 3 is an enlarged, cross-sectional view of one embodiment of a beam forming element 30 and transmitting lens 32 that may be used to generate the non-contiguous beamlets 14 of FIG. 2. Beam forming elements of this type may be commonly referred to as holographic elements. Beam forming element 30 may be formed of a transparent material such as quartz having a first side 48 and a second side 50. Beam forming element 30 may be fabricated in any suitable manner such as by a photo-lithographic process.

First side 48 is flat such that light propagates through it with relatively little refraction. Second side 50, however, has a contour such that light passing through it is refracted at differing angular levels. When used in conjunction with transmitting lens 32, the light refracted at various levels is focused to form multiple beamlets 14 that are transmitted toward target 20. In the particular embodiment shown, second side 50 has a stair step-shaped contour with multiple sides that are each sized according to the wavelength of light comprising the light beam 40. However, any suitable contour may be implemented that causes light beam 40 to be split into multiple beamlets 14 with a sufficient level of efficiency.

Figure 4:
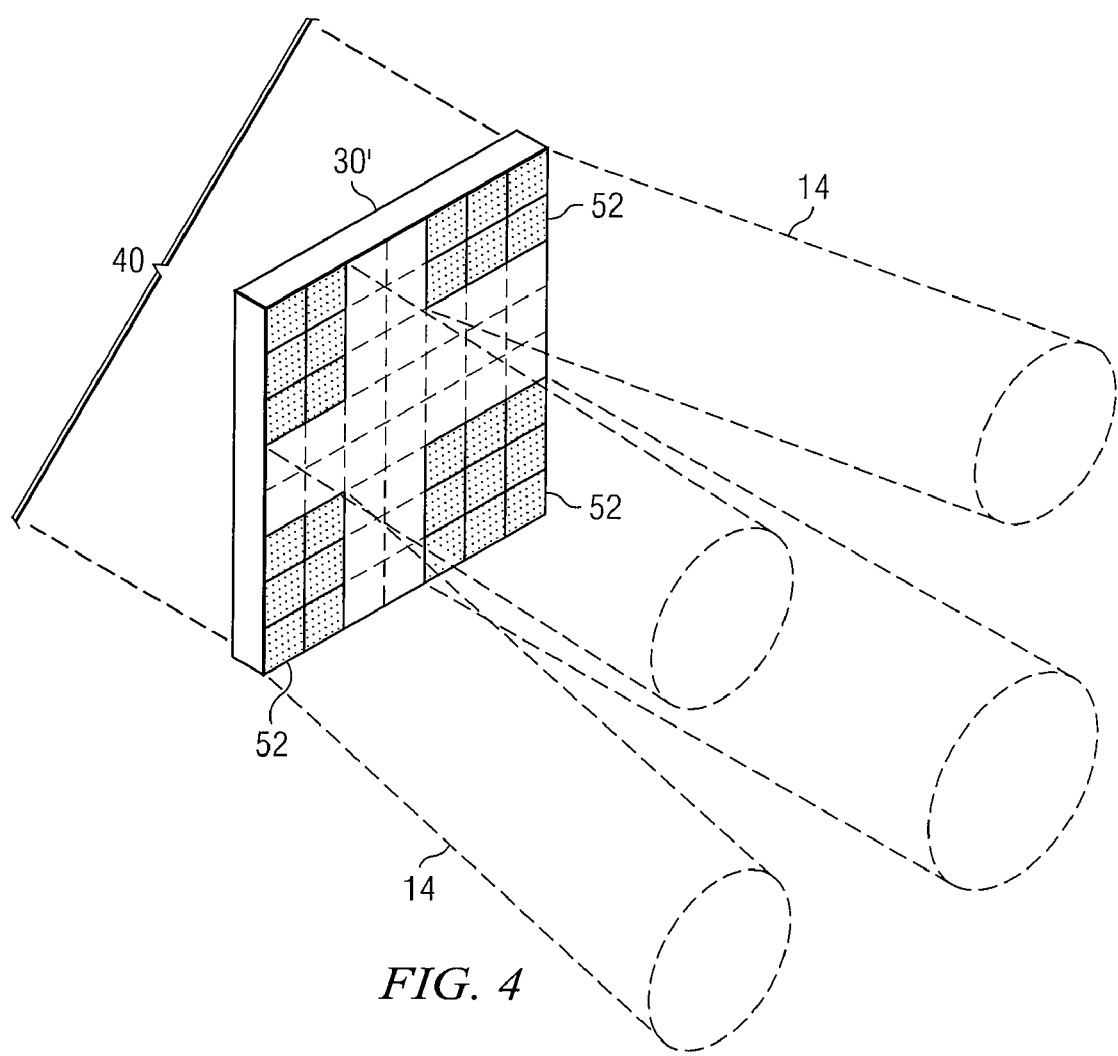
FIG. 4 is an enlarged, perspective view of another embodiment of a beam forming element that may be used with the laser detection and ranging system of FIG. 2.

FIG. 4 is an enlarged, perspective view of another embodiment of a beam forming element 30+ that may be used with the laser detection and ranging system 12 of FIG. 2. In this particular embodiment, beam forming element 30+ is an optical phased array (OPA) that functions as a beam forming element to split light beam 40 into multiple non-contiguous beamlets 14. Beam forming element 30' manipulates light beam 40 over its cross sectional area in a one-dimensional or two-dimensional fashion. Beam forming element 30+ has multiple programmable elements 52 that may be controlled to manipulate light generated by laser light source 24. Programmable elements 52 are arranged over the surface of beam forming element 30+ and are each designed to change from a transparent state to a phase shifting state in which light propagating through its associated portion of the beam forming element 30+ is at least partially refracted.

Programmable elements 52 may be controlled in any suitable manner, such as by processing circuit 38 that is also used to determine various characteristics of target 20.

Beam forming element 30 including an optical phased array may provide an advantage over one including a holographic element in that the quantity and direction of beamlets 14 may be modified during its operation. For example, beam forming element 30+ may be originally configured to split light beam 40 into a 3-by-9 array of non-contiguous beamlets 14. Due to changing conditions, processing circuit 38 or another suitable form of control may be used to manipulate programmable elements 52 such that light beam 40 is split into a 5-by-5 array of non-contiguous beamlets 14.

Modifications, additions, or omissions may be made to laser detection and ranging system 12 without departing from the scope of the disclosure. The components of laser detection and ranging system 12 may be integrated or separated. For example, laser light source 24 may be integrally formed with beam forming element 30 or may be constructed independently of beam forming element 30. Moreover, the operations of laser detection and ranging system 12 may be performed by more, fewer, or other components. For example, laser detection and ranging system 12 may include other optical elements that shape, focus, or filter certain portions of light beam 40, beamlets 14, and/or backscattered light 18 for improved performance. As another example, processing circuit 38 may include various processing components such as filters or other types of signal conditioning components for manipulating received signals from detector 36. Additionally, operations of processing circuit 38 may be performed using any suitable logic comprising software, hardware, and/or other logic.

Although one embodiment has been illustrated and described in detail, it will be recognized that substitutions and alterations are possible without departing from the spirit and scope of the present disclosure, as defined by the following claims.

What is claimed is:

1. A laser detection and ranging (LADAR) system comprising:
    a laser light source that is operable to generate a coherent light beam comprising periodic pulses of light energy;
    a beam forming element in optical communication with the laser light source and operable to split the coherent light beam into a plurality of beamlets that are directed toward a target in a two-dimensional field-of-view, the plurality of beamlets being non-contiguous, essentially equally spaced apart relative to one another, and non-colinear in the two-dimensional field-of-view, wherein the beam forming element comprises a plurality of programmable elements, each programmable element being operable to change from a transparent state to a phase-shifting state in which light propagating through is at least partially refracted; and
    a light detector operable to receive at least a portion of at least one of the plurality of beamlets reflected from the target and generate a signal from the at least one beamlet, the signal being indicative of a range of the target.

2. The laser detection and ranging system of claim 1, wherein the beam forming element comprises a holographic element.

3. The laser detection and ranging system of claim 1, wherein the beam forming element comprises an optical phased array.

4. A laser detection and ranging (LADAR) system comprising:
    a light source that is operable to generate a coherent light beam;
    a beam forming element in optical communication with the light source and operable to split the coherent light beam into a plurality of beamlets that are directed toward a target in a two-dimensional field-of-view, the plurality of beamlets being non-colinear in the two-dimensional field-of-view, wherein the beam forming element comprises a plurality of programmable elements, each programmable element being operable to change from a transparent state to a phase-shifting state in which light propagating through is at least partially refracted; and
    a light detector operable to receive at least a portion of at least one of the plurality of beamlets reflected from the target and generate a signal from the at least one beamlet, the signal being indicative of a characteristic of the target.

5. The laser detection and ranging system of claim 4, wherein the beam forming element comprises a holographic element.

6. The laser detection and ranging system of claim 4, wherein the beam forming element comprises an optical phased array.

7. The laser detection and ranging system of claim 4, wherein the light source is operable to generate a coherent light beam comprising periodic pulses of light energy.

8. The laser detection and ranging system of claim 4, wherein the light source is a laser light source.

9. The laser detection and ranging system of claim 4, wherein the plurality of beamlets are non-contiguous with one another.

10. The laser detection and ranging system of claim 4, wherein the plurality of beamlets are essentially equally spaced apart from one another.

11. The laser detection and ranging system of claim 4, further comprising a transmitting lens in optical communication with the beam forming element and operable to focus the plurality of beamlets toward the target.

12. The laser detection and ranging system of claim 4, wherein the characteristic of the target is a range of the target from the laser detection and ranging system.

13. A method comprising:
    splitting a coherent light beam into a plurality of beamlets, wherein splitting the coherent light beam into the plurality of beamlets comprises directing the coherent light beam through a plurality of programmable elements, each programmable element being operable to change from a transparent state to a phase-shifting state in which light propagating through is at least partially refracted;
    directing the plurality of beamlets toward a target in a two-dimensional field-of-view, the plurality of beamlets being non-colinear in the two-dimensional field-of-view;
    receiving, by a light detector, at least a portion of at least one of the beamlets reflected from the target; and
    generating a signal from the at least one beamlet, the signal being indicative of a characteristic of the target.

14. The method of claim 13, wherein splitting the coherent light beam into the plurality of beamlets comprises splitting, using a holographic element, the coherent light beam into the plurality of beamlets.

15. The method of claim 13, wherein splitting the coherent light beam into the plurality of beamlets comprises splitting, using an optical phased array, the coherent light beam into the plurality of beamlets.

16. The method of claim 13, further comprising generating the coherent light beam using periodic pulses of light energy.

17. The method of claim 13, further comprising generating the coherent light beam using a laser light source.

18. The method of claim 13, wherein splitting the coherent light beam into the plurality of beamlets comprises splitting the coherent light beam into the plurality of beamlets that are non-contiguous with one another.

19. The method of claim 13, wherein splitting the coherent light beam into the plurality of beamlets comprises splitting the coherent light beam into the plurality of beamlets that are essentially equally spaced apart from one another.

20. The method of claim 13, further comprising focusing, using a transmitting lens, the plurality of beamlets on the target.

21. The method of claim 13, wherein the characteristic comprises a range of the target from the laser detection and ranging system.

* * * * *